US012789648B2

(12) United States Patent
Favaretto

(10) Patent No.: US 12,789,648 B2
(45) Date of Patent: Nov. 10, 2026

(54) MOTOR VEHICLE PROVIDED WITH FUEL CELLS

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 267 days.

(21) Appl. No.: 18/511,145

(22) Filed: Nov. 16, 2023

(65) Prior Publication Data

US 2024/0166061 A1 May 23, 2024

(51) Int. Cl.

| | |
|---|---|
| ***B60L 50/71*** | (2019.01) |
| ***B60K 15/01*** | (2006.01) |
| ***H01M 8/2475*** | (2016.01) |
| ***H01M 8/2483*** | (2016.01) |
| ***H01M 8/2484*** | (2016.01) |

(52) U.S. Cl.

CPC ............ *B60L 50/71* (2019.02); *B60K 15/013* (2013.01); *H01M 8/2475* (2013.01); *H01M 8/2483* (2016.02); *H01M 8/2484* (2016.02); *H01M 2250/20* (2013.01)

(58) Field of Classification Search

CPC .......... B60L 50/71; B60L 50/50; B60L 58/33; H01M 8/2483; H01M 8/284; H01M 8/2475; H01M 2250/20; H01M 8/00; H01M 8/04007; H01M 8/249; B60K 15/013; B60K 15/063; B60K 15/067; B60K 1/00; B60K 1/04; B60K 11/02; Y02E 60/50

USPC ........................................................ 180/65.1

See application file for complete search history.

(56) References Cited

U.S. PATENT DOCUMENTS

| | | | | |
|---|---|---|---|---|
| 5,641,031 | A | 6/1997 | Riemer et al. | |
| 8,016,062 | B2 * | 9/2011 | Jufuku | H01M 8/2475 180/68.5 |
| 8,820,451 | B2 * | 9/2014 | Matsumoto | B60K 13/02 180/68.5 |
| 9,083,025 | B2 * | 7/2015 | Thomas | H01M 8/2483 |
| 9,882,230 | B2 * | 1/2018 | Hausmann | H01M 8/2485 |
| 10,181,616 | B2 * | 1/2019 | Murata | H01M 8/0662 |
| 10,322,647 | B2 * | 6/2019 | Naito | H01M 8/04089 |
| 2003/0070858 | A1 | 4/2003 | Kondo | |
| 2003/0230443 | A1 * | 12/2003 | Cramer | B62D 21/152 180/65.51 |

(Continued)

FOREIGN PATENT DOCUMENTS

| | | | |
|---|---|---|---|
| JP | 03109127 A * | 5/1991 | |
| JP | H03109127 A | 5/1991 | |
| WO | 2022108446 A1 | 5/2022 | |

OTHER PUBLICATIONS

Translation of JP-03109127-A accessed at www.espacenet.com on Nov. 29, 2025. (Year: 1991).*

(Continued)

*Primary Examiner* — James A Shriver, II
*Assistant Examiner* — Hilary L Johns
(74) *Attorney, Agent, or Firm* — CANTOR COLBURN LLP

(57) ABSTRACT

A motor vehicle has a pitch axis, a frame and a plurality of fuel cell stacks carried by the frame in respective fixed positions relative to the frame, wherein each of the fuel cell stacks comprises an outer casing and a plurality of fuel cells arranged in series within the outer casing, with the fuel cell stacks aligned along a rectilinear direction belonging to a plane orthogonal to the pitch axis.

13 Claims, 5 Drawing Sheets

(56) References Cited

U.S. PATENT DOCUMENTS

| | | | | |
|---|---|---|---|---|
| 2005/0064257 | A1* | 3/2005 | Isoda | H01M 8/04029<br>429/469 |
| 2009/0101423 | A1* | 4/2009 | Jufuku | H01M 8/04291<br>429/428 |
| 2013/0168167 | A1* | 7/2013 | Matsumoto | B60K 13/02<br>180/65.31 |
| 2015/0318562 | A1* | 11/2015 | Hausmann | H01M 8/04097<br>429/457 |
| 2017/0096172 | A1* | 4/2017 | Nagaosa | H01M 8/04201 |
| 2018/0205106 | A1* | 7/2018 | Murata | B60L 58/33 |
| 2018/0257508 | A1* | 9/2018 | Naito | B60K 1/00 |
| 2021/0257647 | A1* | 8/2021 | Ohhashi | H01M 8/0273 |

OTHER PUBLICATIONS

Italian Search Report for Application No. 202200023907; Filing Date, Nov. 21, 2022; Mailing Date, Jul. 11, 2023; 7 pages.

* cited by examiner

MOTOR VEHICLE PROVIDED WITH FUEL CELLS

CROSS-REFERENCE TO RELATED APPLICATIONS

This patent application claims priority from Italian patent application no. 102022000023907 filed on Nov. 21, 2022, the entire disclosure of which is incorporated herein by reference.

TECHNICAL FIELD

The invention relates to a motor vehicle provided with fuel cells, in particular fed with hydrogen to produce electrical energy through an electrochemical reaction with oxygen.

PRIOR ART

Some motor vehicles have a propulsion system based on fuel cell stacks.

A fuel cell stack is known as a device including a series of fuel cells, normally aligned along a rectilinear axis and fed with a flow of a fuel, usually hydrogen, which passes through all cells of the stack entering and exiting through special inlet and outlet ports obtained on an end plate, which is part of an outer casing of the stack.

The cells of the stack are also passed through by a flow of a reactant, usually oxygen, suitable to cause an electrochemical reaction with the fuel, such that the electrochemical reaction produces a flow of electrons, that is, an electric current, and a waste substance.

For example, the waste substance is water when the fuel and the reactant are hydrogen and oxygen, respectively.

Like the fuel, the reactant also enters and exits through special inlet and outlet ports obtained on the end plate.

The cells are all arranged inside the outer casing of the stack.

The fuel and the reactant reach or are supplied to each of the cells through ducts extending within the outer casing of the stack.

Each fuel cell comprises three adjacent portions, namely an anode, a cathode, and an electrolyte.

Typically, the anode and the cathode respectively comprise plates with respective surfaces facing each other.

Each of the facing surfaces defines a plurality of channels for the fuel and the reactant, respectively.

In the most common cases, the fuel is supplied to the anode channels, whereas the reactant is supplied to the cathode channels.

The electrolyte is arranged between the faces and is adapted to allow positive ions to pass through it, while preventing the passage of electrons. Therefore, the electrolyte allows the fuel and the reactant to chemically interact at the surfaces facing each other but blocks the passage of electrons.

The cathode and the anode include respective catalysts at the channel-defining surfaces, i.e., at the respective anode/electrolyte and electrolyte/cathode interfaces.

The anode catalyst, usually a platinum dust deposit, promotes fuel cracking into positive ions and electrons.

The cathode catalyst, usually nickel, promotes a reaction between the positive ions passing through the electrolyte and the reactant, where the reaction produces the waste substance.

In addition, the cathode and the anode are electrically connected to each other as part of an electrical circuit.

In this way, the electrons pass from the anode to the cathode via the electrical circuit, bypassing the electrolyte and thus forming an electric current.

The electrical circuit then includes a device typically referred to as a load, which is configured to store electrical energy from the electric current passing through the electrical circuit.

Thus, the stored electrical energy can be used by one or more electric motors in the motor vehicle's propulsion system, or to power other electrical devices, without any loss of generality.

In the sector, the use of fuel cell stacks is extremely attractive as it allows sufficient electrical energy to be generated for the propulsion of a motor vehicle.

Furthermore, the electrical energy is possibly obtained without producing harmful emissions, for example since the waste substance is water when the fuel and the reactant are hydrogen and oxygen, respectively.

Generally, therefore, there is a need to improve the conditions of application of fuel cell stacks in motor vehicles.

More particularly, there is a need to optimize the use of available vehicle space to allocate the fuel cell stacks needed for propulsion.

The object of the invention is to meet at least one of the above needs, preferably in a simple and reliable way.

DESCRIPTION OF THE INVENTION

The object is achieved by means of a motor vehicle as defined in claim 1.

The dependent claims define particular embodiments of the invention.

BRIEF DESCRIPTION OF THE DRAWINGS

To better understand the invention, one embodiment thereof is described hereinafter by way of non-limiting example and with reference to the accompanying drawings, wherein.

EMBODIMENTS OF THE INVENTION

Figure 1:
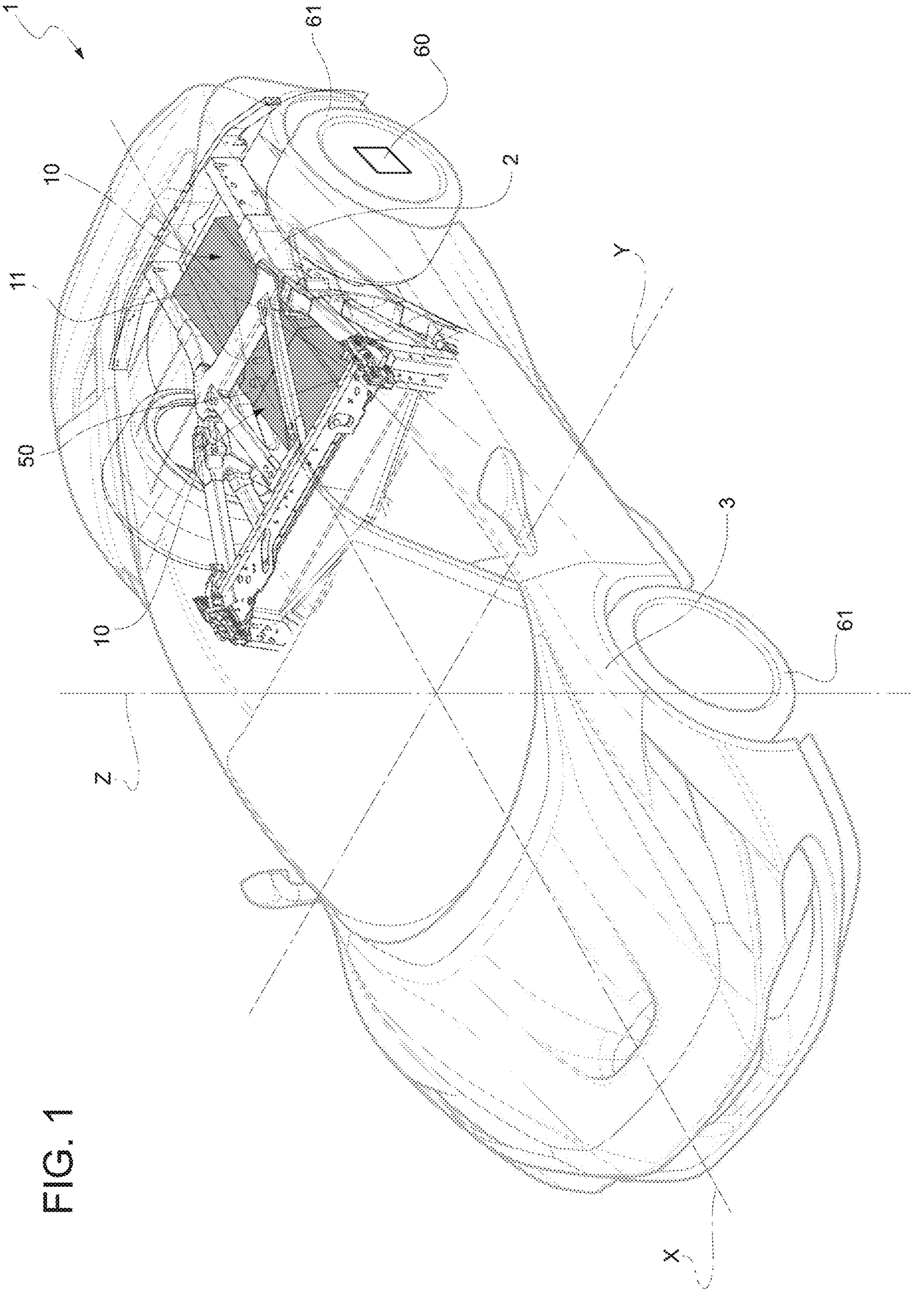
FIG. 1 is a perspective view, with parts in transparency, of a motor vehicle according to the invention.

In FIG. 1, reference number 1 is used to indicate a motor vehicle as a whole, specifically a motor vehicle, particularly a sports or racing motor vehicle.

The motor vehicle 1 comprises a body, which in turn comprises a frame 2 and a bodywork 3 supported by the frame 2 and defining the outer surfaces of the motor vehicle 1.

The motor vehicle 1 also has an advancement direction, whereby the frame 2 has a front portion, not shown, and a rear portion 4.

Moreover, the motor vehicle 1 has a roll axis X, which is coincident with the advancement direction or longitudinal axis.

In addition, the motor vehicle 1 also has a pitch axis Y and a yaw axis Z which, together with the roll axis X, define a Cartesian reference system of the motor vehicle 1, as is known in the sector.

During the use of the motor vehicle 1, the axis Y is typically horizontal and orthogonal to the advancement direction. The axis Z is orthogonal to the axes X, Y and to the profile of the road travelled by the motor vehicle 1 in use.

The frame 2 has a bottom 5, for example comprising or defined by a floor, which is adapted to face the road, i.e., it faces the road during the use of the motor vehicle 1.

More precisely, the bottom 5 has a lower surface 6, in use facing the road, and an upper surface 7 opposite to the lower surface 6 and generally facing upwards, in use.

The bottom 5 also has an intermediate portion 5*a* and a rear portion 5*b* which continues from the intermediate portion 5*a* extending behind it, i.e., towards the rear of the motor vehicle 1, according to the advancement direction.

The surface 6 has a portion 6*b* at the rear portion 5*b*.

Similarly, the surface 7 has a portion 7*b* at the rear portion 5*b*.

Specifically, but not necessarily, the portion 5*b* is also an end or tail portion of the bottom 5 according to the advancement direction or the axis X.

In other words, the bottom 5 ends with the portion 5*b*. In still other words, the portion 5*b* defines the tail of the bottom 5.

The portion 5*b* is preferably inclined with respect to the portion 5*a*.

The inclination of the portion 5*b* is defined in the plane of the axes X, Z, i.e., the plane orthogonal to the axis Y. In other words, the portion 5*b* is inclined with respect to the portion 5*a* according to or along the axis X, that is, the advancement direction.

The portion 5*b* is inclined upwards. More precisely, the inclination of the portion 5*b* is such that the same portion 5*b* forms an upward ramp from the intermediate portion towards the rear of the motor vehicle 1.

The portion 5*a* is preferably adapted to remain substantially parallel to the road during the use of the motor vehicle 1.

In other words, the portion 5*a* extends substantially in a plane orthogonal to the axis Z.

Figure 2:
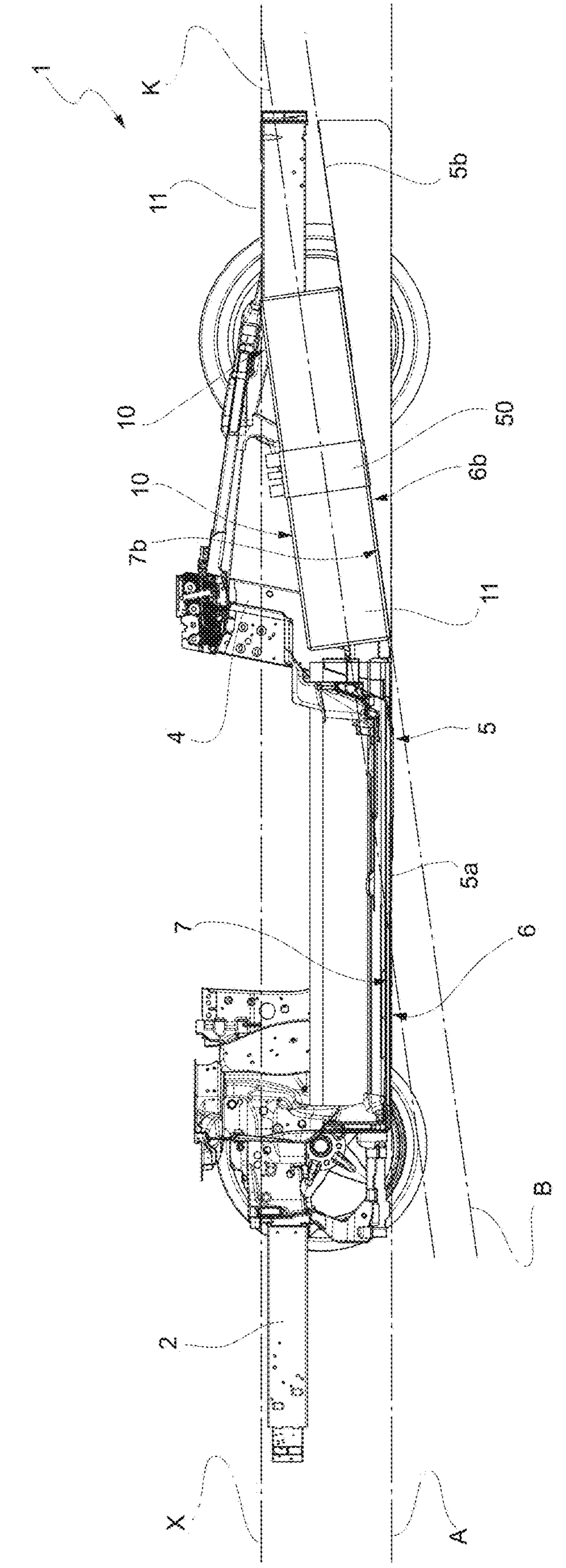
FIG. 2 is a side view of a frame of the motor vehicle in FIG. 1.

Referring to FIG. 2, i.e., in a plane defined by the axes X, Z, i.e., a plane orthogonal to the axis Y, the portion 5*a* extends in a rectilinear direction A, whereas the portion 5*b* extends in a rectilinear direction B.

Specifically, but not necessarily, the rectilinear direction A is parallel or coincident with the axis X.

The rectilinear direction B, together with the rectilinear direction A or the axis X, forms an acute angle.

In other words, the direction B is inclined with respect to the direction A or the axis X, just like the portion 5*b* is inclined with respect to the portion 5*a*, or a plane defined by the axes X, Y, i.e., a plane orthogonal to the axis Z.

The acute angle formed by the directions A, B looks toward the rear of the motor vehicle 1 and is defined above the direction A.

The acute angle is preferably less than 20°.

The motor vehicle 1 further comprises a plurality of fuel cells 10, i.e., at least two stacks 10.

The stacks 10 are carried by the frame 2 in respective fixed positions relative thereto.

The stacks 10 are aligned along a rectilinear direction or alignment direction belonging to the plane orthogonal to the axis Y.

Specifically, the direction of alignment of the stacks 10 is parallel or coincident with the direction B. Therefore, the direction of alignment of the stacks 10 is inclined with respect to the axis X and, with the axis X, forms an acute angle.

The acute angle looks toward the rear of the motor vehicle 1 and is defined above the roll axis, or more precisely above the direction A.

In other words, as for example directly and unequivocally derivable from FIG. 2, the direction of alignment of the stacks 10 is inclined upwards in the direction opposite the direction of advancement of the motor vehicle 1, i.e., moving towards the rear of the motor vehicle 1.

The acute angle is preferably less than 20°.

The stacks 10 are preferably arranged in an intermediate, or more precisely middle area of the frame 2 or the motor vehicle 1 in relation to the axis Y.

Specifically, the stacks 10 rest on the portion 5*b*, particularly directly, i.e., they are directly supported by the portion 5*b* on the surface 7*b*.

Preferably, one of the stacks 10 has one end arranged at the intersection between the portions 5*a*, 5*b*.

Clearly, the fact that the stacks 10 rest on the portion 5*b* implies that the stacks 10 are arranged above the portion 5*b*.

In other words, the stacks 10 rest on the portion 5*b* of the bottom 5 on the side opposite the one facing the road during the use of the motor vehicle 1.

According to a potential alternative, the stacks 10 could also possibly be hung on the portion 5*b*.

Therefore, in general, the stacks 10 are fixed to the bottom 5 at the portion 5*b*.

Figure 3:
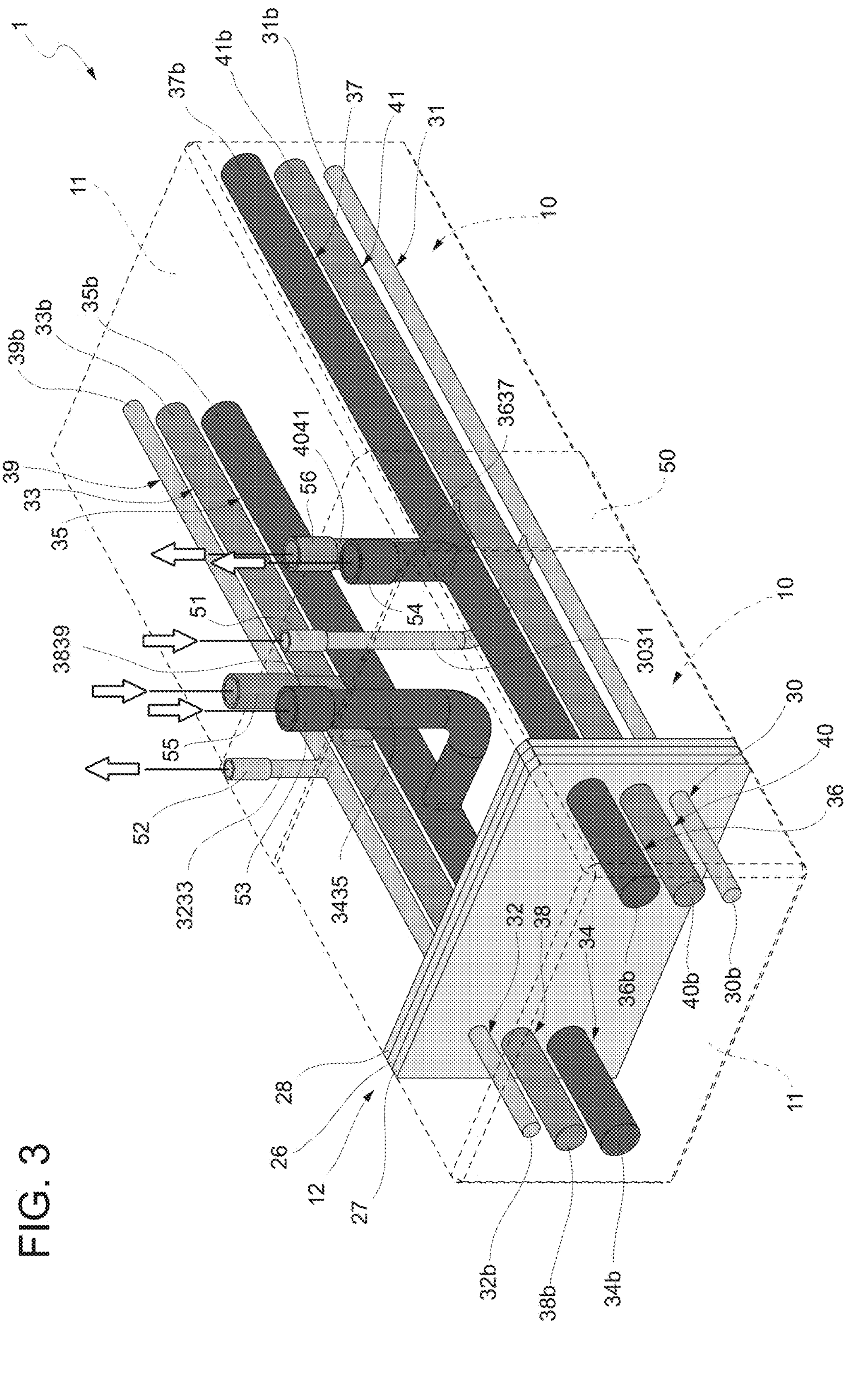
FIG. 3 is a perspective view, in enlarged scale and with parts removed for clarity, of a pair of fuel cell stacks of the motor vehicle 1.
Figure 4:
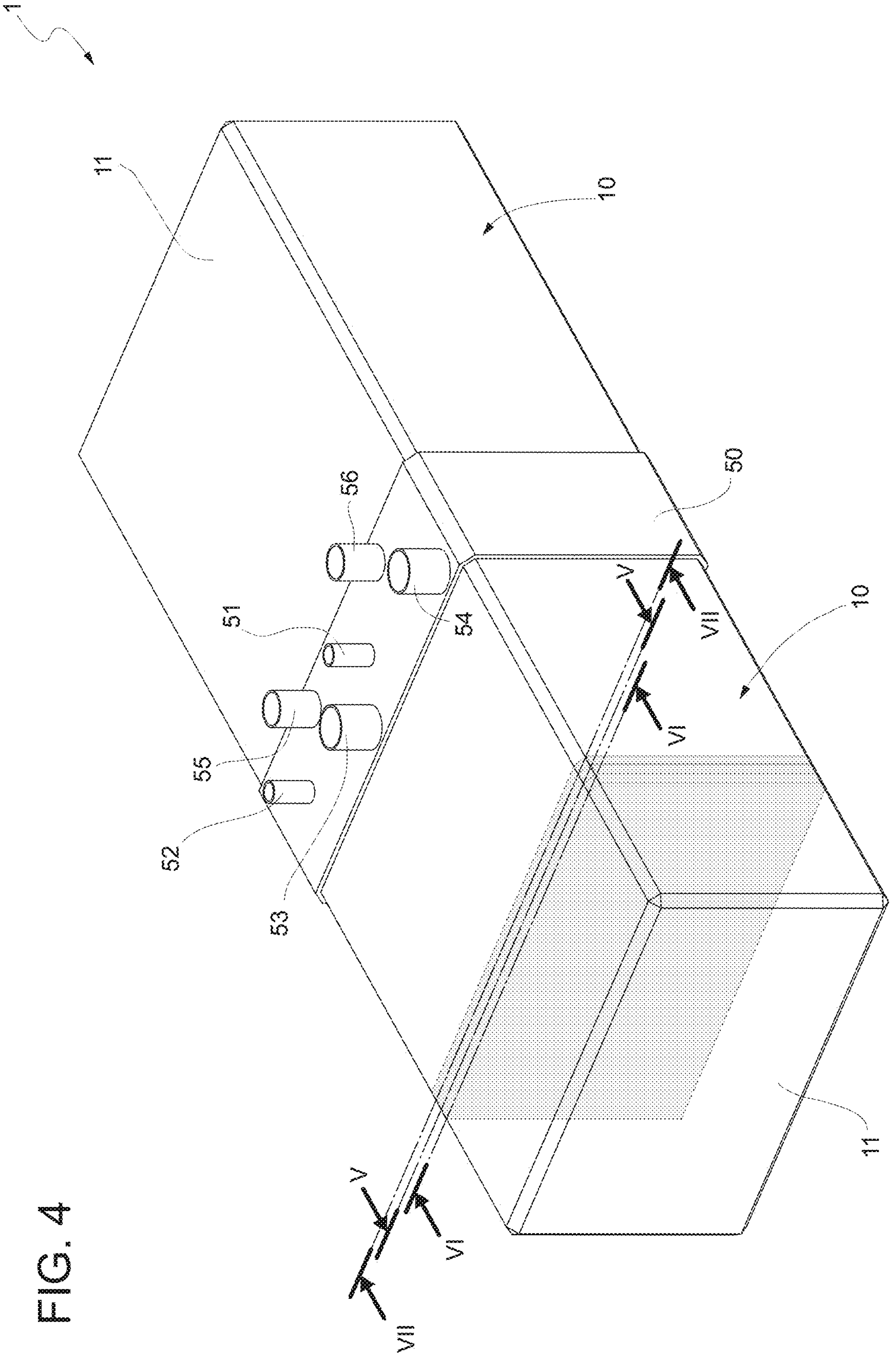
FIG. 4 is an additional perspective view of the fuel cell stacks in FIG. 3, with the outer contours visible, the outer surfaces transparent, and the ducts further removed for clarity compared to FIG. 3, and FIGS. 5, 6, 7 are respective schematic sections of one of the fuel cell stacks according to respective section planes indicated by the lines V-V, VI-VI, VII-VII in FIG. 4.

Each of the stacks 10 has a corresponding outer casing 11 and a plurality of fuel cells 12, only one of which is schematically shown in FIG. 3 for reasons of comprehensibility.

The fuel cells 12 of each stack 10 are arranged inside the corresponding casing 11.

The fuel cells 12 of each stack 10 are arranged in series, and in particular aligned with each other along a rectilinear direction K of the plane orthogonal to the axis Y.

Preferably, the direction K is also the direction of alignment of the stacks 10.

More specifically, the direction K is parallel to or coincident with the direction B.

Each of the fuel cells 12 could be known per se, therefore a detailed description and/or illustration is unnecessary.

In fact, those skilled in the art are well aware of how the known fuel cells are manufactured and how they work.

However, each one of the fuel cells 12 comprises at least

- a fuel circuit 13 comprising an inlet 14 for receiving a fuel as input, an outlet 15 for discharging the unconsumed fuel, and ducts 16 for circulating the fuel from the inlet 14 to the outlet 15,
- a reactant circuit 17 comprising an inlet 18 for receiving as input a reactant suitable for reacting with the fuel and generating an electric current and a waste substance, an outlet 19 for discharging the unconsumed reactant and the waste substance, and ducts 20 for circulating the reactant from the inlet 18 to the outlet 19, and
- a refrigerant circuit 21 comprising an inlet 22 for receiving as input a fresh refrigerant to draw heat from the fuel cell 12, an outlet 23 for discharging the refrigerant heated by the drawn heat, and ducts 24 for circulating the refrigerant from the inlet 22 to the outlet 23.

During the operation of each fuel cell 12, a part of the fuel circulating in the fuel circuit 13 is consumed as it is subjected to an electrochemical reaction.

The electrochemical reaction takes place with a part of the reactant circulating in the reactant circuit 17 and through an electrolyte 26 of the fuel cell 12.

The electrochemical reaction cracks the fuel into positive ions and electrons.

The positive ions pass through the electrolyte 26 and bind to the reactant, thus forming therewith the waste substance.

The electrolyte 26 itself, at the same time, prevents the passage of electrons.

The latter bypass the electrolyte 26 through an electrical circuit of the fuel cell 12, thus forming an electrical current.

The electrical current produced by each of the fuel cells 12 adds to the other fuel cells 12 of the stack 10 arranged in series.

The current resulting from the sum defines the current supplied by the stack 10.

The part of the reactant that actually reacts with the fuel is consumed through the formation of the waste substance.

The electrolyte 26 could, for example, comprise a proton exchange membrane arranged between the circuits 13, 17 so that it simultaneously comes into contact with the fuel and the reactant at its respective opposite surfaces.

In greater detail, each fuel cell 12 comprises two plates 27, 28 aligned along the direction K, and the electrolyte 26 is sandwiched between the plates 27, 28 along the direction K.

The plates 27, 28 are part of a cathode and an anode, respectively, of the fuel cell 12.

Figure 6:
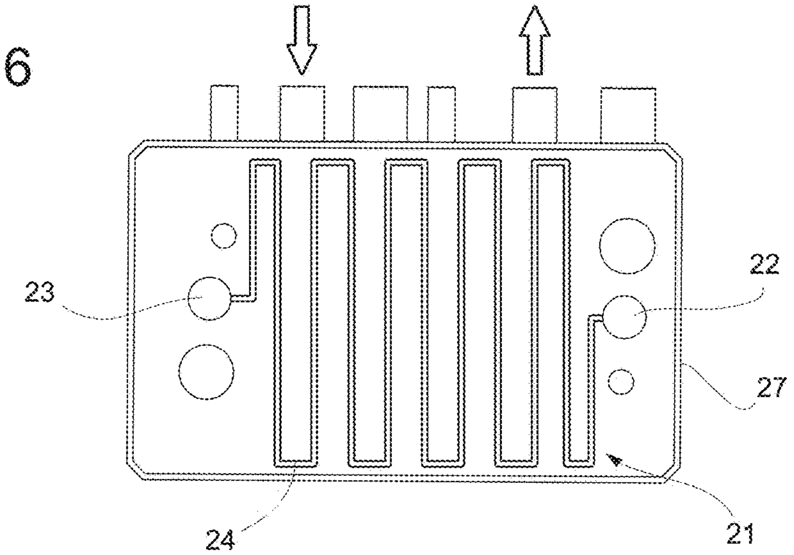

FIG. 6 shows a face, or more generally a section of the plate 27 on which the refrigerant circuit 21 is visibly formed.

Figure 5:
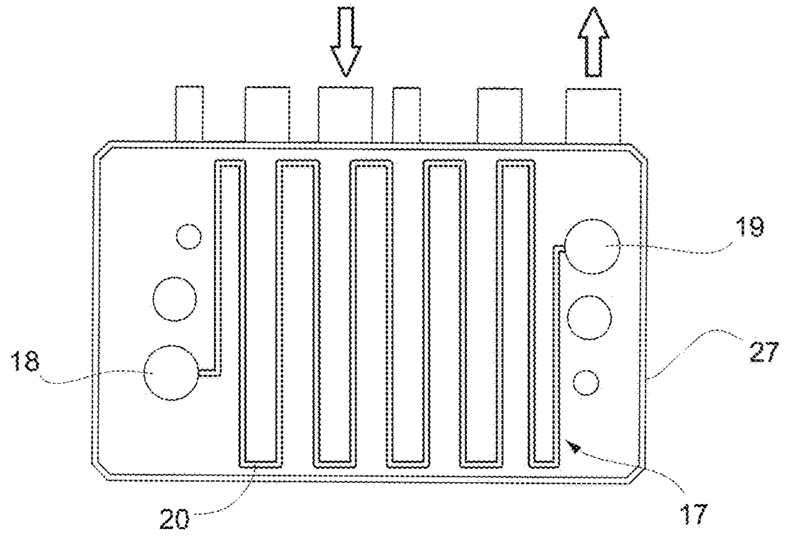

FIG. 5 shows another face of the plate 27, possibly opposite the previous face. The other face is in contact with the electrolyte 26; the reactant circuit 17 is formed on the other face in a visible way.

Figure 7:
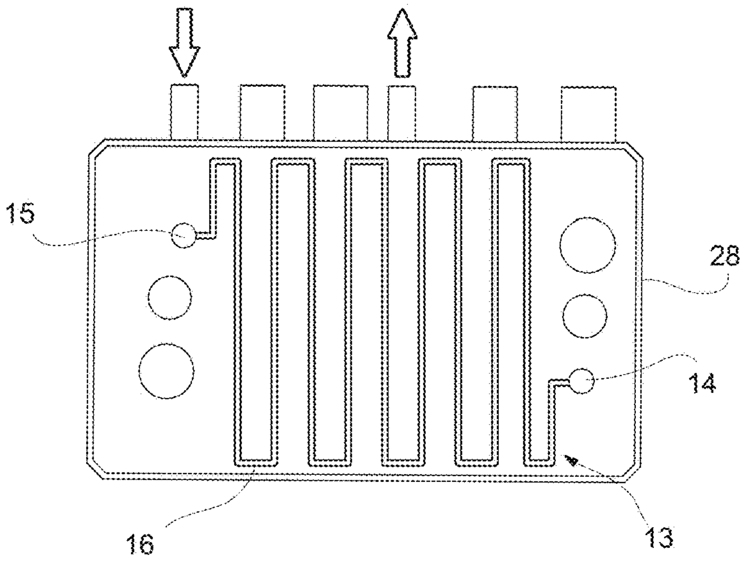

FIG. 7 shows a face of the plate 28 facing the other face in FIG. 5. The face in FIG. 7 is in contact with the electrolyte 26; the fuel circuit 13 is formed on the face in FIG. 7 in a visible way.

With reference to FIGS. 5, 6, the inlets 14, 18 are arranged in diametrically opposite areas of the fuel cell 12 around the direction K, as are the outlets 15, 19, in a similar but independent manner.

In addition, the two stacks 10 comprise respective fuel inlet ducts 30, 31 respectively configured to supply fuel to one, several, or in this case all the fuel cells 12 of both stacks 10.

In particular, the respective inlets 14 of the supplied fuel cells 12 of the two stacks 10 communicate with the ducts 30, 31, respectively, to receive the fuel.

Furthermore, the two stacks 10 comprise respective fuel exhaust ducts 32, 33 respectively configured to discharge the fuel from one, several, or in this case all the fuel cells 12 of both stacks 10.

In particular, the respective outlets 15 of the fuel cells 12 of the two stacks 10 communicate with the ducts 32, 33, respectively, to discharge the supplied, unconsumed fuel.

Moreover, the two stacks 10 comprise respective reactant inlet ducts 34, 35 respectively configured to supply the reactant to one, several, or in this case all the fuel cells 12 of both stacks 10.

In particular, the respective inlets 18 of the supplied fuel cells 12 of the two stacks 10 communicate with the ducts 34, 35, respectively, to receive the reactant.

Furthermore, the two stacks 10 comprise respective reactant exhaust ducts 36, 37 respectively configured to discharge the reactant from one, several, or in this case all the fuel cells 12 of both stacks 10.

In particular, the respective outlets 19 of the fuel cells 12 of the two stacks 10 communicate with the ducts 32, 33, respectively, to discharge the supplied, unconsumed reactant, as well as in particular the waste substance.

Moreover, the two stacks 10 comprise respective refrigerant inlet ducts 38, 39 respectively configured to supply the refrigerant to one, several, or in this case all the fuel cells 12 of both stacks 10.

In particular, the respective inlets 22 of the supplied fuel cells 12 of the two stacks 10 communicate with the ducts 38, 39, respectively, to receive the refrigerant.

Furthermore, the two stacks 10 comprise respective refrigerant exhaust ducts 40, 41 respectively configured to discharge the refrigerant from one, several, or in this case all the fuel cells 12 of both stacks 10.

In particular, the respective outlets 23 of the fuel cells 12 of the two stacks 10 communicate with the ducts 40, 41, respectively, to discharge the refrigerant.

Preferably, the motor vehicle 1 further comprises an end plate 50 arranged between the casings 11 along the direction K or the direction of alignment of the stacks 10.

The end plate 50 is fixed in relation to the casings 11.

The end plate 50 specifically has six ports 51, 52, 53, 54, 55, 56.

Preferably, the ducts 30, 31 share the port 51 as a common end. In other words, the ducts 30, 31, through the plate 50, have at least one common section 3031 ending or starting with the port 51, and two respective disjointed sections **30*b*, 31*b* respectively extending within the casings 11. In particular, the sections 30*b*, 31*b* bifurcate from the section 3031** in opposite directions.

Alternatively or additionally, the ducts 32, 33 share the port 52 as a common end. In other words, the ducts 32, 33, through the plate 50, have at least one common section 3233 ending or starting with the port 52, and two respective disjointed sections **32*b*, 33*b* respectively extending within the casings 11. In particular, the sections 32*b*, 33*b* bifurcate from the section 3233** in opposite directions.

Alternatively or additionally, the ducts 34, 35 share the port 53 as a common end. In other words, the ducts 34, 35, through the plate 50, have at least one common section 3435 ending or starting with the port 53, and two respective disjointed sections **34*b*, 35*b* respectively extending within the casings 11. In particular, the sections 35*b* bifurcate from the section 3435** in opposite directions.

Alternatively or additionally, the ducts 36, 37 share the port 54 as a common end. In other words, the ducts 36, 37, through the plate 50, have at least one common section 3637 ending or starting with the port 54, and two respective disjointed sections **36*b*, 37*b* respectively extending within the casings 11. In particular, the sections 36*b*, 37*b* bifurcate from the section 3637** in opposite directions.

Alternatively or additionally, the ducts 38, 39 share the port 55 as a common end. In other words, the ducts 38, 39, through the plate 50, have at least one common section 3839 ending or starting with the port 55, and two respective disjointed sections **38*b*, 39*b* respectively extending within the casings 11. In particular, the sections 38*b*, 39*b* bifurcate from the section 3839** in opposite directions.

Alternatively or additionally, the ducts 40, 41 share the port 56 as a common end. In other words, the ducts 40, 41, through the plate 50, have at least one common section 4041 ending or starting with the port 56, and two respective disjointed sections 40*b*, 41*b* respectively extending within the casings 11. In particular, the sections 40*b*, 41*b* bifurcate from the section 4041 in opposite directions.

Preferably, one, several, or specifically all the disjointed sections 30*b*, 31*b*, 32*b*, 33*b*, 34*b*, 35*b*, 36*b*, 37*b*, 38*b*, 39*b*, 40*b*, 41*b* extend along respective axes parallel to the direction K.

In addition, conveniently, one, several, or specifically all the pairs of sections defined by the disjointed sections 30*b*-31*b*, 32*b*-33*b*, 34*b*-35*b*, 36*b*-37*b*, 38*b*-39*b*, 40*b*-41*b* each extend along the same axis, i.e., the disjointed sections of the pairs are aligned with each other, particularly along the axes parallel to the direction K.

In particular, the sections 30*b*, 31*b* include or pass through the inlets 14 of the fuel cells 12.

Alternatively or additionally, the sections 32*b*, 33*b* include or pass through the outlets 15 of the fuel cells 12.

Alternatively or additionally, the sections 34*b*, 35*b* include or pass through the inlets 18 of the fuel cells 12.

Alternatively or additionally, the sections 36*b*, 37*b* include or pass through the outlets 19 of the fuel cells 12.

Alternatively or additionally, the sections 38*b*, 39*b* include or pass through the inlets 22 of the fuel cells 12.

Alternatively or additionally, the sections 40*b*, 41*b* include or pass through the outlets 23 of the fuel cells 12.

In particular, the pair defined by the sections 30*b*, 31*b* and the pair defined by the sections 32*b*, 33*b* extend parallel to the direction K at respective opposite ends of the casings 11 according to the axis Y, and independently and preferably at respective opposite ends of the casings 11 according to an axis perpendicular to the axis Y and the direction K.

Alternatively or additionally, the pair defined by the sections 34*b*, 35*b* and the pair defined by the sections 36*b*, 37*b* extend parallel to the direction K at respective ends of the casings 11 according to the axis Y, and independently and preferably at respective opposite ends of the casings 11 according to an axis perpendicular to the axis Y and the direction K.

Alternatively or additionally, the pair defined by the sections 38*b*, 39*b* and the pair defined by the sections 40*b*, 41*b* extend parallel to the direction K at respective ends of the casings 11 according to the axis Y.

More specifically, the axes of the sections 30*b*, 31*b*, 36*b*, 37*b*, 40*b*, 41*b* all belong to the same plane, specifically orthogonal to the axis Y.

Alternatively or additionally, the axes of the sections 32*b*, 33*b*, 34*b*, 35*b*, 38*b*, 39*b* all belong to the same plane, specifically orthogonal to the axis Y.

The sections 30*b*, 31*b* are arranged in an area of the stacks 10 which is diametrically opposite to the one in which the sections 32*b*, 33*b* are arranged.

Similarly, but not necessarily, the sections 34*b*, 35*b* are arranged in an area of the stacks 10 which diametrically opposite to the one in which the sections 36*b*, 37*b* are arranged.

In the embodiment in FIG. 3, the pair defined by the sections 38*b*, 39*b* is arranged between the pair defined by the sections 32*b*, 33*b* and the pair defined by the sections 34*b*, 35*b*.

In addition, the pair defined by the sections 40*b*, 41*b* is arranged between the pair defined by the sections 30*b*, 31*b* and the pair defined by the sections 36*b*, 37*b*.

Preferably, the pair defined by the sections 30*b*, 31*b* is arranged below the pair defined by the sections 36*b*, 37*b*.

Similarly, but not necessarily, the pair defined by the sections 32*b*, 33*b* is arranged above the pair defined by the sections 34*b*, 35*b*.

From the above, it is clear that each of the fuel, the reactant and the refrigerant can be generalized to a generic fluid supplied to the fuel cells 12 and then discharged from the same after the completion of its functions.

For example, the fuel comprises or is defined by hydrogen.

Moreover, for example, the reactant comprises or is defined by oxygen. The oxygen could simply be part of the air around the motor vehicle 1. Therefore, the reactant could also be considered as comprising or defined by air, more generally.

In addition, for example, the refrigerant may comprise or be defined by water.

In the case where the fuel and the reactant were hydrogen and oxygen or air, respectively, the waste substance would comprise or be defined by water, although in particular not the same water as the refrigerant.

The motor vehicle 1 further comprises at least one electric motor 60 (shown schematically) and wheels 61 arranged to contact the ground.

Preferably, the electric motor 60 is coupled to at least one of the stacks 10 or to both of the stacks 10, i.e., it is powered by them. Therefore, the electric motor 60 is configured to deliver mechanical power through the stacks 10.

Furthermore, the motor vehicle 1 comprises a transmission device, for example of a known type, not shown, to transmit the mechanical power to the wheels 61.

Like the known electric motors, the motor 60 has a stator and a rotor, not shown. Specifically, the rotor is fixed in relation to one of the wheels 61, i.e., it rotates rigidly together or integrally with the wheel 61.

In other words, the electric motor 60 is integrated with the wheel 61, particularly via the transmission device, in this case more specifically defined by a fastening device, specifically fastening the rotor to the wheel 61.

In addition, the motor vehicle 1 conveniently comprises an additional electric motor 60 powered by the stacks 10 and integrated with another wheel 61 having the same axis as the previous wheel 61.

During the operation of the motor vehicle 1, the fuel cells 12 receive the fuel from the port 51 through the ducts 30, 31, and the reactant from the port 53 through the ducts 34, 35, in particular at the plates 28, 27, respectively.

Here, the fuel separates into electrons and positive ions; the latter pass through the electrolyte 26 and bind to the reactant, thus forming the waste substance. The electrons form an electrical current that is preferably stored in an electrical energy storage device, such as a battery, of the motor vehicle 1.

Downstream of the electrochemical reaction, the fuel cells 12 discharge the fuel and the reactant not consumed by the reaction; the unconsumed fuel is discharged from the port 52 via the ducts 32, 33, whereas the unconsumed reactant is discharged from the port 54 via the ducts 36, 37.

The electrical current produced by the fuel cells 12 and hence by the stacks 10 powers, preferably downstream of one or more conversions, for example via an inverter, the motor 60.

The motor 60 rotates the wheels 61, thus allowing a driver to drive the motor vehicle 1.

The advantages of the motor vehicle 1 are clear from the foregoing.

The alignment of the stacks 10 according to the direction of advancement of the motor vehicle 1 is particularly favourable with respect to the distribution of spaces in the motor vehicle 1, which can be made with the body having a narrower shape at the rear and with a reduced height.

In contrast, according to the prior art, the stacking of the stacks 10 in height and laterally entails an increase in the height and width of the body of the motor vehicle 1.

Furthermore, the inclination of the portion 5*b* of the bottom 5 is particularly advantageous, as the bottom thus becomes aerodynamic and contributes to generating downforce on the motor vehicle 1.

In addition, the fact that one of the stacks 10 is arranged at the intersection between the portions 5*a*, 5*b* is advantageous since the centre of gravity of the set of aligned stacks 10 is thus brought as low as possible, hence also shifting downwards the overall centre of gravity of the motor vehicle 1.

Furthermore, in this way, the moment of inertia with respect to the axis Z is smaller since the set of stacks 10 is brought closer to the overall centre of gravity of the motor vehicle 1 according to the axis X.

In addition, the alignment of the stacks 10 according to the direction of advancement of the motor vehicle 1 allows the provision of the single end plate 50 for the two stacks 10. In contrast, according to the prior art, each stack is provided with a corresponding end plate.

Lastly, it is clear that modifications and variations may be made to the motor vehicle 1 according to the invention, without however departing from the scope of protection defined by the claims.

In particular, each the of details depicted schematically in the figures, especially with reference to the ducts 30, 31, 32, 33, 34, 35, 36, 37, 38, 39, 40, 41, is independent of the other details and is specifically designed to solve specific technical problems in isolation from the other details.

Also, the number of each of the components shown may be different from what is described and shown in the figures.

The invention claimed is:

1. A motor vehicle (1) having a pitch axis (Y), a frame (2) and a plurality of fuel cell stacks (10) carried by the frame (2) in respective fixed positions relative to the frame (2),
- wherein each of the plurality of fuel cell stacks (10) comprises an outer casing (11) and a plurality of fuel cells (12) arranged in series within the outer casing (11),
- characterized in that the fuel cell stacks (10) are aligned along a rectilinear direction (K, B) belonging to a plane orthogonal to the pitch axis (Y).

2. The motor vehicle according to claim 1, further having a roll axis (X), wherein the rectilinear direction (K, B) is inclined upwards with respect to the roll axis (X) towards a rear of the motor vehicle (1) and forms with the roll axis (X) an acute angle extending towards a rear of the motor vehicle (1).

3. The motor vehicle according to claim 1, wherein the frame (2) comprises a bottom (5) adapted to face a ground surface, and wherein the fuel cell stacks (10) rest on a portion (5*b*) of the bottom (5).

4. The motor vehicle according to claim 3, wherein the portion (5*b*) of the bottom (5) on which the fuel cell stacks (10) rest is a rear end portion (5*b*) of the bottom (5),
- the rear end portion (5*b*) being inclined relative to an intermediate portion (5*a*) of the bottom (5) according to an advancement direction of the motor vehicle (1) so as to form an upward ramp from the intermediate portion (5*a*) towards a rear of the motor vehicle (1).

5. The motor vehicle according to claim 1, wherein the fuel cell stacks (10) comprise a first stack and a second stack having respectively
- a first and a second outer casing (11),
- a first and a second inlet duct (30, 31, 34, 35, 38, 39) configured respectively to supply a fluid to at least one of the fuel cells (12) of the first stack and to at least one of the fuel cells (12) of the second stack,
- a first and a second exhaust duct (32, 33, 36, 37, 40, 41) configured respectively to discharge said fluid from the at least one of the fuel cells (12) of the first stack and from the at least one of the fuel cells (12) of the second stack,
- the motor vehicle further comprising an end plate (50) arranged between the first and second outer casings (11) according to said rectilinear direction (K, B) and having at least one first port (51, 52, 53, 54, 55, 56), wherein at least one of
- a) a first pair of ducts defined by the first and second inlet ducts (30, 31, 34, 35, 38, 39), and
- b) a second pair of ducts defined by the first and second exhaust ducts (32, 33, 36, 37, 40, 41)
- shares the first port (51, 52, 53, 54, 55, 56) as a first common end.

6. The motor vehicle according to claim 5, wherein the end plate (50) additionally has a second port (51, 52, 53, 54, 55, 56), and wherein the other of the first and second pair of ducts shares the second port (51, 52, 53, 54, 55, 56) as a second common end.

7. The motor vehicle according to claim 5, wherein the first and second inlet ducts (30, 31, 34, 35, 38, 39) are configured to supply fluid to all fuel cells (12) of the first stack and all fuel cells (12) of the second stack respectively,
- and/or wherein the first and second exhaust ducts (32, 33, 36, 37, 40, 41) are configured to discharge fluid from all fuel cells (12) of the first stack and all fuel cells (12) of the second stack respectively.

8. The motor vehicle according to claim 5, wherein said fluid is selected from
- a fuel for the fuel cells (12),
- a reactant for reacting with the fuel at the fuel cells (12), thereby generating an electric current and a waste substance, and
- a refrigerant fluid.

9. The motor vehicle according to claim 1, further comprising
- at least one electric motor (60) coupled to one or more of the fuel cell stacks (10) in a manner to be powered by the one or more of the fuel cell stacks (10) to deliver mechanical power suitable for driving the motor vehicle (1),
- at least one wheel (61) arranged to contact the ground, and
- a transmission means to transmit the mechanical power delivered by the electric motor (60) to the wheel (61).

10. The motor vehicle according to claim 9, wherein the electric motor (60) is integrated with the wheel (61) via the transmission means.

11. A motor vehicle (1) having a pitch axis (Y), a frame (2) and a plurality of fuel cell stacks (10) carried by the frame (2) in respective fixed positions relative to the frame (2),
- wherein each of the fuel cell stacks (10) comprises an outer casing (11) and a plurality of fuel cells (12) arranged in series within the outer casing (11),
- characterized in that the fuel cell stacks (10) are aligned along a rectilinear direction (K, B) belonging to a plane orthogonal to the pitch axis (Y); and wherein the fuel cell stacks (10) comprise a first stack and a second stack having respectively:

a first and a second outer casing (11), a first and a second inlet duct (30, 31, 34, 35, 38, 39) configured respectively to supply a fluid to at least one of the fuel cells (12) of the first stack and to at least one of the fuel cells (12) of the second stack, a first and a second exhaust duct (32, 33, 36, 37, 40, 41) configured respectively to discharge said fluid from the at least one of the fuel cells (12) of the first stack and from the at least one of the fuel cells (12) of the second stack, the motor vehicle further comprising an end plate (50) arranged between the first and second outer casings (11) according to said rectilinear direction (K, B) and having at least one first port (51, 52, 53, 54, 55, 56), wherein at least one of:

a) a first pair of ducts defined by the first and second inlet ducts (30, 31, 34, 35, 38, 39), and b) a second pair of ducts defined by the first and second exhaust ducts (32, 33, 36, 37, 40, 41)

shares the first port (51, 52, 53, 54, 55, 56) as a first common end.

12. A motor vehicle (1) having a pitch axis (Y), a frame (2) and a plurality of fuel cell stacks (10) carried by the frame (2) in respective fixed positions relative to the frame (2), wherein each of the fuel cell stacks (10) comprises an outer casing (11) and a plurality of fuel cells (12) arranged in series within the outer casing (11), characterized in that the fuel cell stacks (10) are aligned along a rectilinear direction (K, B) belonging to a plane orthogonal to the pitch axis (Y); and wherein the frame (2) comprises a bottom (5) adapted to face a ground surface, and wherein the fuel cell stacks (10) are positioned above a portion (5*b*) of the bottom (5).

13. The motor vehicle according to claim 12, wherein the portion (5*b*) of the bottom (5) on which the fuel cell stacks (10) rest is a rear end portion (5*b*) of the bottom (5), the rear end portion (5*b*) being inclined relative to an intermediate portion (5*a*) of the bottom (5) according to an advancement direction of the motor vehicle (1) so as to form an upward ramp from the intermediate portion (5*a*) towards a rear of the motor vehicle (1).

* * * * *